(12) United States Patent
Duffield

(10) Patent No.: US 6,964,111 B1
(45) Date of Patent: Nov. 15, 2005

(54) FOLDING DRYWALL SQUARE

(76) Inventor: Tim Duffield, P.O. Box 354, Oaks, PA (US) 19456

( * ) Notice: Subject to any disclaimer, the term of this patent is extended or adjusted under 35 U.S.C. 154(b) by 0 days.

(21) Appl. No.: 10/828,619

(22) Filed: Apr. 22, 2004

(51) Int. Cl.[7] ............................................. B43L 13/00
(52) U.S. Cl. ........................... 33/478; 33/456; 33/458; 33/474
(58) Field of Search ......................... 33/415, 418, 456, 33/458, 474, 478, 481, 42, 374, DIG. 1

(56) References Cited

U.S. PATENT DOCUMENTS

| | | | | |
|---|---|---|---|---|
| 134,919 A | * | 1/1873 | Moore ........................... | 33/413 |
| 396,099 A | * | 1/1889 | Lutz .............................. | 33/458 |
| 735,201 A | | 8/1903 | Blandin | |
| 856,820 A | * | 6/1907 | Stimpson ...................... | 33/458 |
| 1,178,156 A | * | 4/1916 | Schauer et al. ............... | 33/478 |
| 1,549,151 A | | 8/1925 | Rasmussen | |
| 1,979,567 A | * | 11/1934 | Nicholson .................... | 33/458 |
| 2,724,184 A | * | 11/1955 | Spear, Jr. ..................... | 33/479 |
| 3,308,543 A | * | 3/1967 | O'Connor .................... | 33/458 |
| 3,792,511 A | * | 2/1974 | Evans .......................... | 33/458 |
| 4,203,227 A | * | 5/1980 | Giroux ......................... | 33/458 |
| 4,580,352 A | * | 4/1986 | Wilson ......................... | 33/563 |
| 4,987,685 A | * | 1/1991 | Libit ............................ | 33/478 |
| D333,991 S | * | 3/1993 | Lee .............................. | D10/62 |

* cited by examiner

Primary Examiner—G. Bradley Bennett
Assistant Examiner—Tania Courson
(74) Attorney, Agent, or Firm—LaMorte & Associates

(57) ABSTRACT

A drywall square having a straight long arm of at least forty-eight inches. The long arm has a first end and a second end, wherein the long arm is segmented into a plurality of sections between those ends. A straight short arm intersects the long arm. A first hinged joint connects the first end of the long arm to the short arm. The first hinged joint enables the short arm to be oriented at a perpendicular to the long arm or folded in parallel atop the long arm. The sections of the long arm are also connected by hinged joints. This enables the sections of the long arm to be unfolded into a linear configuration or folded together into a neat stack. Connectors are also provided that are used to retain the square either in its fully open configuration or its fully folded configuration.

10 Claims, 4 Drawing Sheets

FOLDING DRYWALL SQUARE

BACKGROUND OF THE INVENTION

1. Field of the Invention

In general, the present invention relates to squares of the type used to mark and cut straight lines in construction materials. More particularly, the present invention relates to squares that can be folded into a compact configuration when not in use.

2. Description of Related Art

In modern construction, many construction materials, such as plywood, paneling, drywall, and foam insulation are sold in large flat sheets. In the United States, the typical sheet size for such materials is eight feet by four feet. However, some sheets are longer and can be up to twelve feet by four feet. When such sheets of construction material are used, some of the material inevitably must be cut into smaller sized pieces to fit a particular need.

Sheet materials can be cut in many different ways using many different tools. For instance, plywood is typically cut with a circular saw. Drywall is typically cut with a razor utility knife. Prior to cutting any sheet construction material, that sheet of construction material is typically measured and marked so that a cut can be precisely made. The prior art is replete with various measuring tools that are used to mark lines on construction material. Since sheet construction material is manufactured in rectangular panels with flat edges, squares are particularly well suited for measuring and marking the sheet material.

The square is an ancient tool that consists of two flat sections that are joined together at a 90-degree angle. Over the years, countless variations of the square have been developed and used. In modern construction, a drywall square is most commonly used to measure and mark sheets of construction material. A modern drywall square has a long arm that extends 48 inches. The long arm is intersected by a short arm that is between 24 inches and 36 inches long. By placing the short arm of the square on the edge of a sheet of construction material, the long arm cab be extended across the full width of the sheet at a right angle to the referenced edge. This enables the sheet of construction material to be rapidly marked and/or cut into smaller square or rectangular pieces with only one measurement.

Although drywall squares are very useful tools for marking and cutting sheets of construction material, they do have some drawbacks. Drywall squares have a long arm that is at least 48 inches long. As such, drywall squares are very long tools that cannot be held within any conventional toolbox or tool belt. Furthermore, since drywall squares are so long, they are easily bent. Once the square bends, it does not lay flush across a sheet of construction material and is no longer useful.

In the long history of squares, there have been invented many squares that fold at the interconnection between the intersecting arms. Such prior art folding squares are exemplified by U.S. Pat. No. 1,549,151 to Rasmussen, entitled Takedown Steel Square and U.S. Pat. No. 735,201 to Blandin, entitled Instrument For Cutting Cloth On The Bias. If this prior art technology were applied to a modern drywall square, it would produce little benefit. If the long arms and short arms of a drywall square were to fold together, the square would still be at least 48 inches long along the long arm. Thus, the drywall square would still not fit into a tool box or tool belt and the drywall square would still be prone to bending.

A need therefore exists for a drywall square with a long arm that is at least 48 inches long, but wherein the square, including the long arm, can be folded into a much shorter configuration when not in use. In this manner, the drywall square would be able to be stored in conventional toolboxes and carried in tool belts. Furthermore, the folded configuration would reduce the likelihood that the drywall square would become bent. This need is met by the present invention as it is described and claimed below.

SUMMARY OF THE INVENTION

A drywall square is provided having a straight long arm of at least forty-eight inches. The long arm has a first end and a second end, wherein the long arm is segmented into a plurality of sections between those ends. A straight short arm is also present. A first hinged joint connects the first end of the long arm to the short arm. The first hinged joint enables the short arm to be oriented at a perpendicular to the long arm or folded in parallel atop the long arm.

The sections of the long arm are also connected by hinged joints. This enables the sections of the long arm to be unfolded into a linear configuration or folded together into a neat stack. Connectors are also provided that are used to retain the square either in its fully open configuration or its fully folded configuration. In this manner, the square will not inadvertently fold or unfold at an inopportune time.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the features of the present invention square can be applied to many different types of squares, these features are particularly useful when applied to a drywall square. Accordingly, by way of example, the present invention will be described as a drywall square in order to set forth the best mode contemplated for the invention. It should therefore be understood that the features described as part of the present invention can be applied to squares other than a drywall square and are intended to be included within the scope of this invention.

Figure 1:
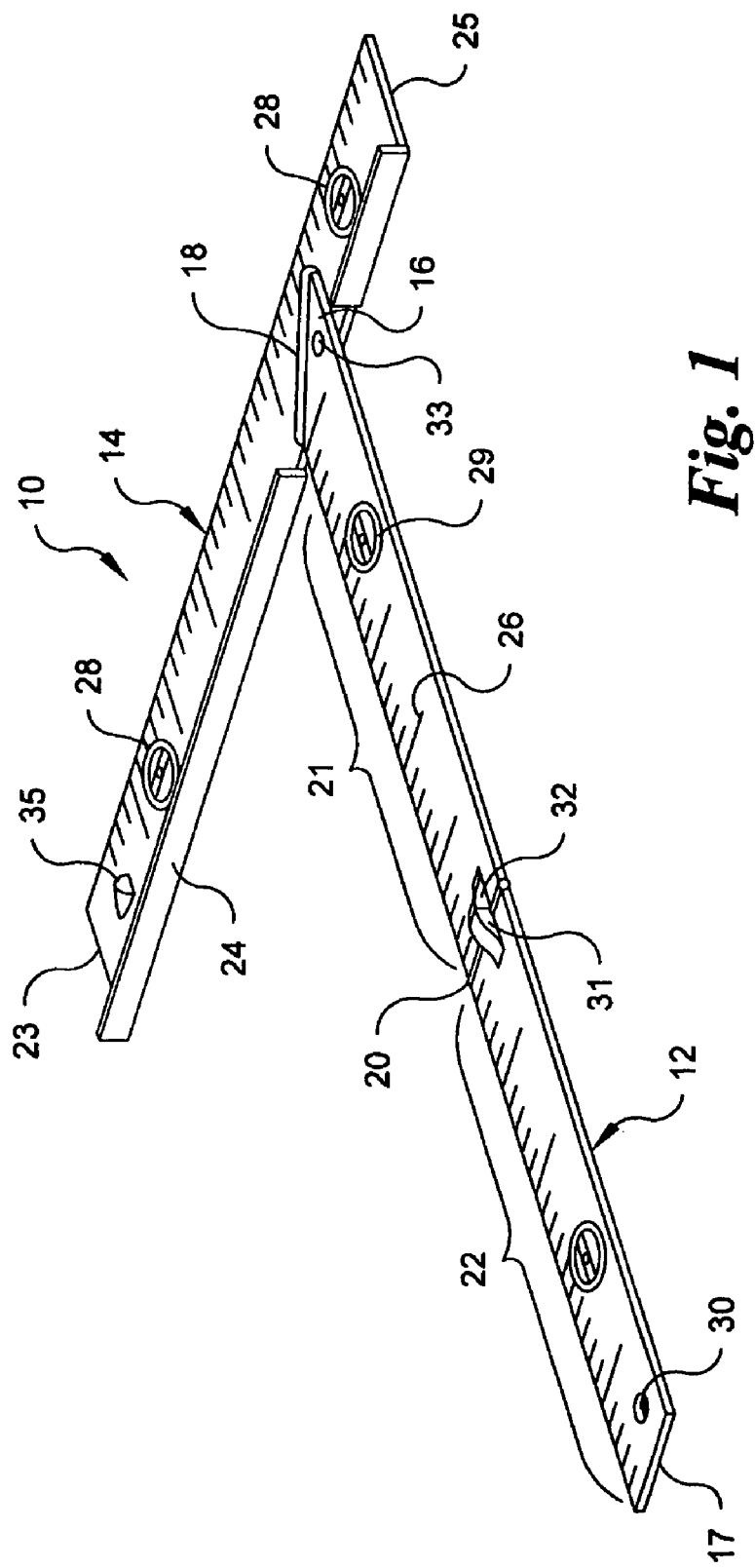
FIG. 1 is a perspective view of an exemplary embodiment of the present invention, shown in an open configuration.

Referring to FIG. 1, an exemplary embodiment of a drywall square 10 is shown. As is traditional with drywall squares, the present invention drywall square 10 has a long arm 12 and a short arm 14. The long arm 12 extends below the short arm 14 by a length of at least 48 inches. In this manner, the long arm 12 can extend across the full width of an eight foot by four foot panel of material.

The long arm 12 has a first end 16 and a second end 17. The first end 16 of the long arm 12 terminates at a first hinged joint 18. The first hinged joint 18 couples the long arm 12 to the short arm 14. The first hinged joint 18 extends at a 45-degree angle with respect to both the length of the long arm 12 and the length of the short arm 14. Consequently, when the first hinged joint 18 is open, the long arm 12 and the short arm 14 are perpendicular to each other, such as is illustrated. However, as will later be explained, the presence of the first hinged joint 18 enables the short arm 14 to be folded into a parallel position atop the long arm 12.

A second hinged joint 20 is disposed along the length of the long arm 12 in between the first end 16 and the second end 17. The second hinged joint 20 is preferably located near the midsection of the long arm 12. The second hinged joint 20 extends across the width of the long arm 12 at a perpendicular. The second hinged joint 20 divides the long arm 12 into an upper section 21 and a lower section 22.

The short arm 14 also has a first end 23 and a second end 25. The first hinged joint 18 is coupled to the short arm 14 at a point in between the first end 23 and the second end 25, at a position that is close to the second end 25. The short arm 14 has a rail 24 along its lower edge that faces the same direction as the length of the long arm 12. A rail 24 is disposed along the short arm 14 and is disrupted only in the area where the long arm 12 intersects the short arm 14.

Both the long arm 12 and the short arm 14 have measurement markings 26 that enable both the long arm 12 and the short arm 14 to be used as rulers. Level bubbles 28, 29 are also disposed within the long arm 12 and the short arm 14, respectively. The level bubbles 28 in the short arm 14 extend in the same direction as the short arm 14. Similarly, the level bubbles 29 in the long arm 12 extend in the same direction as the long arm 12.

Magnets 30, 31, 32, 33, 34, 35 are optionally positioned within both the long arm 12 and the short arm 14. As will be explained, the magnets 30, 31, 32, 33, 34, 35 are used to both hold the square 10 open when it is unfolded and to hold the square 10 closed when it is folded. In FIG. 1, it can be seen that two magnets are positioned on opposite sides of the second hinged joint 20. The two magnets 31, 32 face each other and abut when the second hinged joint 20 is unfolded and both the lower section 22 and the upper section 21 of the long arm 12 are linearly aligned. When the second hinged joint 20 is unfolded, the magnets 31, 32 attract each other and prevent the second hinged joint 20 from folding closed. Thus, the long arm 12 of the present invention square 10 can be lifted through the air, unsupported and in any orientation, without the second hinged joint 20 folding. However, by applying a folding force to the second hinged joint 20 that is greater than the attraction force of the opposed magnets 31, 32, the magnets 31, 32 can be separated and the lower section 22 of the long arm 12 can be folded about the second hinged element 20 against the upper section 21 of the long arm 12.

Figure 2:
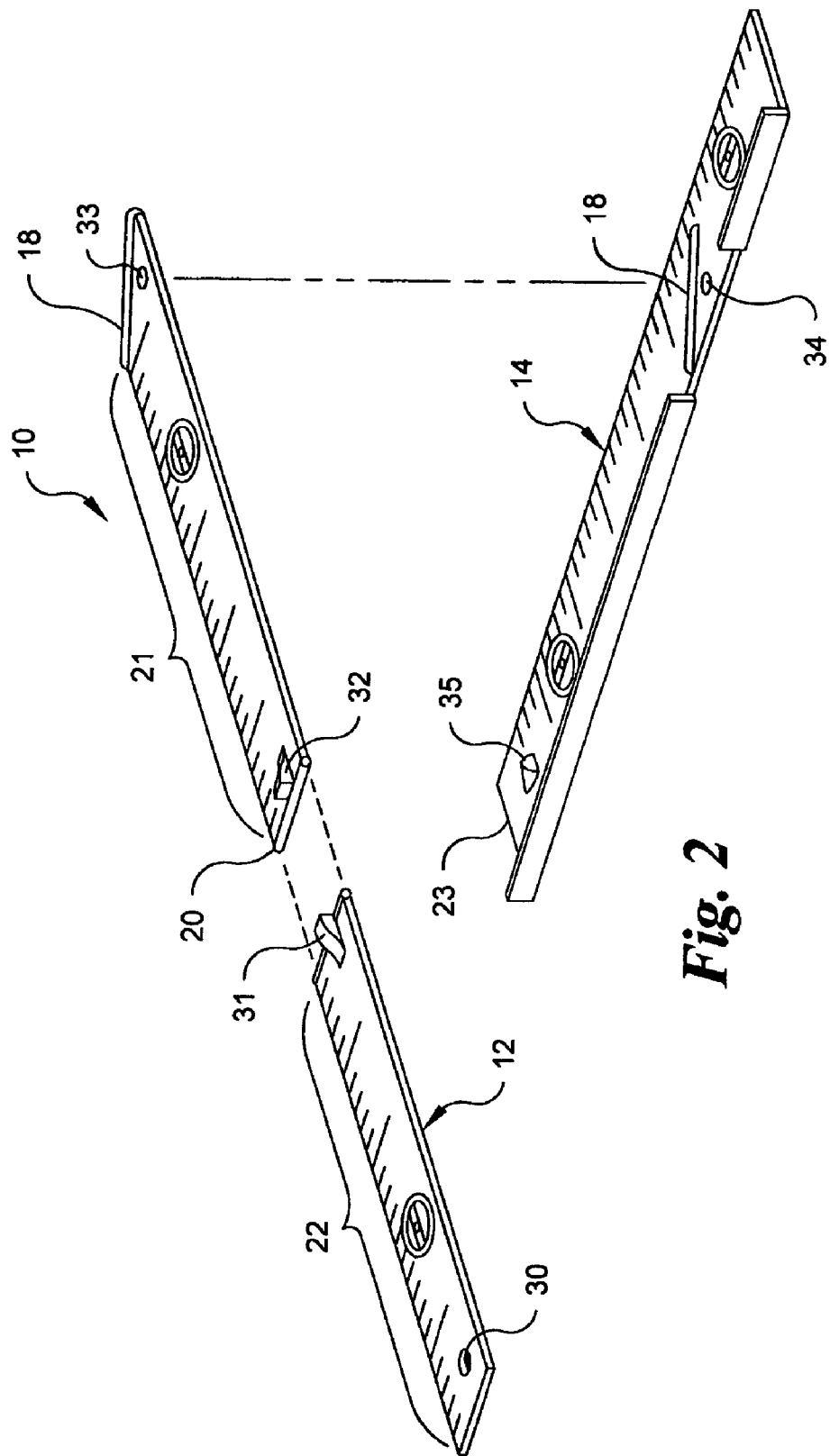
FIG. 2, is an exploded, perspective view of the embodiment of FIG. 1.

Referring to FIG. 2, it can be seen that a first magnet 33 is disposed in the upper section 21 of the long arm 12 immediately next to the first hinged joint 18. A second magnet 34 is disposed in the short arm 14, also near the first hinged joint 18. When the drywall square 10 is open, such as shown in FIG. 1, the first magnet 33 on the long arm 12 abuts against the second magnet 34 in the short arm 14, wherein the first magnet 33 and the second magnet 34 attract each other. This biases the short arm 14 and the long arm 12 together in a perpendicular orientation. Thus, the attraction of the first magnet 33 and the second magnet 34 holds the drywall square 10 open and prevents the first hinged joint 18 from folding closed. The long arm 12 of the present invention square 10 can be lifted through the air, unsupported and in any orientation, without the first hinged joint 18 folding. However, by applying a folding force to the first hinged joint 18 that is greater than the attraction force of the opposed magnets 33, 34, the magnets 33, 34 can be separated and the short arm 14 folded about the first hinged element 18 against the long arm.

Figure 3:
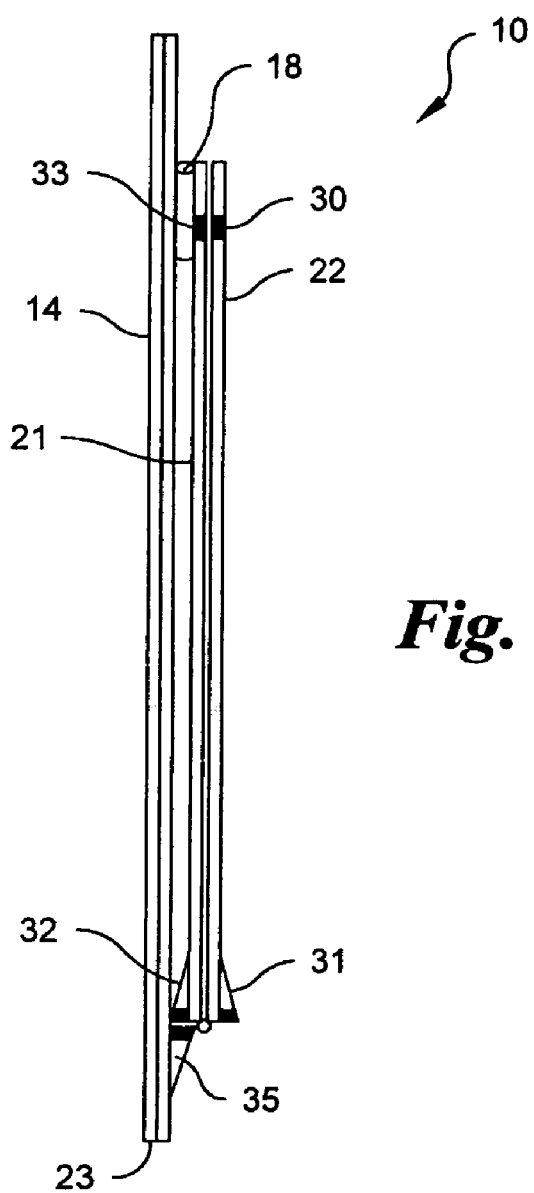
FIG. 3 is a cross-sectional top view of the exemplary embodiment of the present invention shown in a folded configuration.

Referring now to FIG. 3 in conjunction with FIG. 2, it can be seen that the drywall square 10 can be folded about the first hinged joint 18 and the second hinged joint 20 into a compact folded configuration. The short arm 14 can be folded about the first hinged joint 18 and lay atop the upper section 21 of the long arm 12 in linear alignment with the upper section 21. Once in this folded configuration, the magnet 35 near the first end 23 of the short arm 14, aligns and connects with the magnet 32 at the bottom of the upper section 21 of the long arm 12. These two magnets 35, 32 connect and hold the short arm 14 in its folded position over the long arm 12.

In a similar manner, when the lower section 22 of the long arm 12 folds about the second hinged joint 20, it folds behind the top section 21 of the long arm 12. The magnet 30 at the bottom of the lower section 22 folds around and abuts against the magnet 33 at the top of the upper section 21 of the long arm 12. The attraction between the two magnets 30, 33 holds the lower section 22 of the long arm 12 in its folded position behind the upper section 21.

When the drywall square 10 is in its folded configuration, the short arm 14 and both the upper section 21 and the lower section 22 of the long arm 12 are stacked against each other in parallel. The short arm 14 is at the front of the folded configuration.

Figure 4:
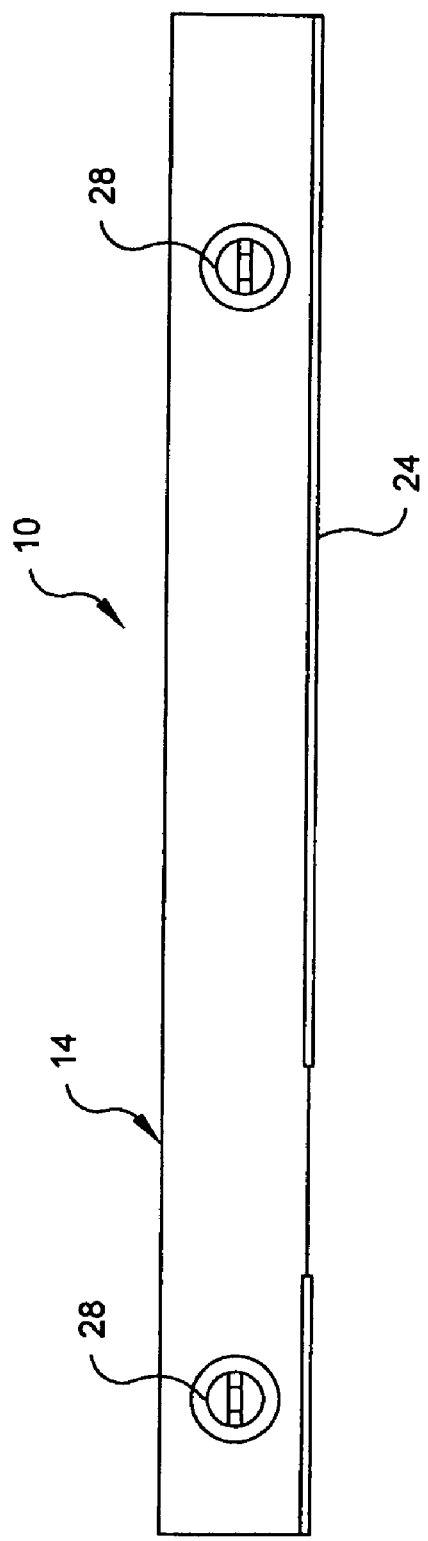
FIG. 4 is a front view of the exemplary embodiment of the present invention shown in a folded configuration.

Referring to FIG. 4, it will be understood that the folded configuration of the drywall square 10 can be used as a level. The leveling bubbles 28 on the short arm 14 are visible on the face of the drywall square 10 in its folded configuration. Furthermore, the rail 24 along the bottom of the short arm 14 extends along the bottom of the folded configuration. The rail 24 is straight. As such, by resting the folded configuration of the drywall square 10 on the rail 24, and observing the leveling bubbles 28, the folded drywall square 10 has the same form and function as a traditional carpenter's level.

The present invention drywall square 10 is a device that is a full sized square, yet can be folded into a much smaller configuration. When folded into the smaller configuration, the drywall square can easily be carried in a tool belt or in a toolbox. Furthermore, when the drywall square 10 is in its folded configuration, the folded configuration reinforces the structure of the square 10 and prevents the sections of the square 10 from being easily bent or damaged. Additionally, when the drywall square 10 is in its folded configuration, the drywall square 10 forms a level and can be utilized as a level.

It will be understood that the embodiment of the present invention described and illustrated is merely exemplary and that alternate embodiments can be made that differ from the shown embodiment. For instance, the magnetic connections between the different folding sections can be replaced with many different types of mechanical connectors, such as latches, clips, Velcro and the like. Furthermore, in the shown embodiment, the long arm folds into two sections and the short arm remains a single section. It will be understood that both the long arm and the short arm of the drywall square can be folded into any plurality of sections. All such alternate embodiments, modifications and variations are intended to be included within the scope of the present invention as defined below by the claims.

What is claimed is:

1. A square that is selectively configurable between a folded condition and an open condition, said square comprising:
   a straight long arm having a first section and a second section that are joined together at a second hinge, wherein said second hinge enables said first section and said second section to fold between a linearly aligned configuration, when said square is in said open condition, and a stacked configuration, when said squared is in said folded condition;
   a first magnet disposed on said first section of said straight long arm proximate said first hinge;
   a second magnet disposed on said second section of said straight long arm proximate said second hinge, wherein said first magnet and said second magnet interact and hold said first section and said second section in said linearly aligned configuration when said square is in said open condition;
   a straight short arm connected to said first section with a first hinge that enables said first section to fold between a perpendicular configuration, where said first section extends at a perpendicular from said straight short arm, and a parallel configuration, where said first section lays atop said straight short arm; and
   a third magnet disposed on said straight short arm that interacts with said first magnet on said first section and retains said first section in said parallel configuration when said square is in said folded condition.

2. The square according to claim 1, further including at least one leveling bubble disposed within said straight short arm.

3. The square according to claim 1, further including a fourth magnet disposed on said first section proximate said second hinge that interacts with said straight short arm and hold said first section in said perpendicular configuration when said square is in said open condition.

4. The square according to claim 3, further including at least one leveling bubble disposed in said straight long arm.

5. The square according to claim 3, wherein said straight long arm has a length of at least forty-eight inches.

6. The square according to claim 3, further including a fifth magnet disposed on said second section that interacts with said third magnet and holds said second section in said stacked configuration when said square is in said closed condition.

7. A square that is selectively configurable between a folded condition and an open condition, said square comprising:
   a straight long arm having a first section and a second section that are joined together at a second hinge, wherein said first hinge enables said second section and said second section to fold between a linearly aligned configuration, when said square is in said open condition, and a stacked configuration, when said squared is in said folded condition;
   a straight short arm connected to said first section with a first hinge connection that enables said first section to fold between a perpendicular configuration, where said first section extends at a perpendicular from said straight short arm, and a parallel configuration, where said first section lays atop said straight short arm; and
   a first connector positioned proximate said second hinge that biases said first section and said second section into said linearly aligned configuration when said square is in said open condition;
   a second connector positioned proximate said first hinge that biases said first section and said straight short arm into said perpendicular configuration when said square is in said open condition.

8. The square according to claim 7, further including at least one leveling bubble disposed within said straight short arm.

9. The square according to claim 7, wherein said first connector is a first set of magnets.

10. The square according to claim 9, wherein said second connector is a second set of magnets.

* * * * *